United States Patent
Madsen et al.

(10) Patent No.: US 8,588,129 B2
(45) Date of Patent: Nov. 19, 2013

(54) TERMINAL AND A METHOD FOR COMMUNICATING SIMULTANEOUSLY ON TWO FREQUENCIES

(75) Inventors: Lars Peter Madsen, Roskilde (DK); Kristjan Sonne Norgaard, Roskilde (DK); Anders Christian Christensen, Holte (DK)

(73) Assignee: Thrane & Thrane A/S, Lyngby (DK)

(*) Notice: Subject to any disclaimer, the term of this patent is extended or adjusted under 35 U.S.C. 154(b) by 0 days.

(21) Appl. No.: 13/519,468

(22) PCT Filed: Dec. 29, 2010

(86) PCT No.: PCT/EP2010/070856
§ 371 (c)(1),
(2), (4) Date: Jun. 27, 2012

(87) PCT Pub. No.: WO2011/080299
PCT Pub. Date: Jul. 7, 2011

(65) Prior Publication Data
US 2012/0307720 A1    Dec. 6, 2012

Related U.S. Application Data

(60) Provisional application No. 61/292,081, filed on Jan. 4, 2010.

(51) Int. Cl.
*H04B 7/185* (2006.01)
(52) U.S. Cl.
USPC .................... 370/316; 370/229; 370/330
(58) Field of Classification Search
USPC ......... 370/316, 252, 229, 230, 235, 280, 319, 370/329, 330, 331, 321, 337, 347, 349, 503, 370/508, 509; 455/435, 453, 517, 67.1, 455/12.1, 13.1, 13.2, 13.3, 428, 427
See application file for complete search history.

(56) References Cited

U.S. PATENT DOCUMENTS

| | | | |
|---|---|---|---|
| 5,398,035 A | | 3/1995 | Densmore et al. |
| 5,434,586 A | | 7/1995 | Kinoshita et al. |
| 5,835,057 A | | 11/1998 | van Heyningen |
| 5,898,681 A | * | 4/1999 | Dutta ............................. 370/229 |
| 6,108,538 A | * | 8/2000 | Blasiak et al. ................ 455/428 |
| 6,151,504 A | * | 11/2000 | Weinhappl ..................... 455/445 |

(Continued)

FOREIGN PATENT DOCUMENTS

| | | |
|---|---|---|
| EP | 0 955 737 | 11/1999 |
| EP | 1 137 197 | 9/2001 |

(Continued)

OTHER PUBLICATIONS

International Search Report.

(Continued)

*Primary Examiner* — Abdullah Riyami
(74) *Attorney, Agent, or Firm* — Harness, Dickey & Pierce, P.L.C.

(57) ABSTRACT

A system for communicating with one or more satellites over two frequencies, where information identifying the second frequency is transmitted over the first frequency. Usually, the most important data is transmitted over the first frequency at which communication usually is the most stable, whereas communication over the second frequency usually has a higher bandwidth.

20 Claims, 2 Drawing Sheets

(56) References Cited

U.S. PATENT DOCUMENTS

| | | |
|---|---|---|
| 6,246,874 B1 | 6/2001 | Voce |
| 6,272,317 B1 | 8/2001 | Houston et al. |
| 6,298,073 B1 * | 10/2001 | LeFever .................. 370/503 |
| 6,356,539 B1 | 3/2002 | Zuliani et al. |
| 6,452,989 B1 * | 9/2002 | Friedman .................. 375/347 |
| 6,556,836 B2 | 4/2003 | Olsen et al. |
| 6,628,919 B1 | 9/2003 | Curello et al. |
| 6,636,734 B1 | 10/2003 | Berger et al. |
| 7,174,127 B2 | 2/2007 | Otten et al. |
| 7,400,857 B2 | 7/2008 | Chang et al. |
| 7,593,726 B2 * | 9/2009 | Karabinis et al. .............. 455/429 |
| 8,135,338 B1 * | 3/2012 | Gelon et al. ................. 455/13.1 |
| 8,290,085 B2 * | 10/2012 | Chan et al. .................... 375/297 |
| 2002/0164957 A1 | 11/2002 | Lovberg et al. |
| 2003/0022694 A1 * | 1/2003 | Olsen et al. .................. 455/562 |
| 2004/0137842 A1 | 7/2004 | Iwata et al. |
| 2004/0208635 A1 * | 10/2004 | Sinsky ......................... 398/183 |
| 2005/0053026 A1 * | 3/2005 | Mullan et al. ................. 370/316 |
| 2006/0133827 A1 * | 6/2006 | Becouarn et al. ............. 398/213 |
| 2007/0015460 A1 * | 1/2007 | Karabinis et al. ............ 455/12.1 |
| 2007/0290936 A1 | 12/2007 | Nielsen |
| 2011/0143656 A1 | 6/2011 | Dankberg et al. |

FOREIGN PATENT DOCUMENTS

| | | |
|---|---|---|
| EP | 1414167 A2 | 4/2004 |
| WO | WO-9956408 A1 | 11/1999 |
| WO | WO 2004/028034 | 4/2004 |

OTHER PUBLICATIONS

Written Opinion of International Searching Authority.

* cited by examiner

TERMINAL AND A METHOD FOR COMMUNICATING SIMULTANEOUSLY ON TWO FREQUENCIES

The present invention relates to the communication simultaneously on two frequencies and in particular to a method where data is transmitted on one of or both of the frequencies where controlling communication is always transmitted on one of the frequencies, typically using a more robust type of communication.

Communication on one or more of multiple frequencies may be seen in: U.S. Pat. Nos. 5,835,057, 5,398,035, 6,556, 836, US2007/0290936 and U.S. Pat. No. 7,400,857.

In a first aspect, the invention relates to a terminal for communicating with one or more remote transponders, the terminal comprising:

means for performing wireless communication with the transponder(s) on each of two different frequencies,
means for receiving or accessing data to be transmitted to the transponder(s),
means for determining any first part of the data for transmission on a first of the two frequencies and any remaining, second part of the data for communication on a second of the frequencies, the performing means being adapted to:

receive, from the transponder(s) and on the first of the frequencies, information identifying the second frequency,
communicate the first part, if any, to the transponder(s) using the first frequency,
communicate the second part, if any, to the transponder(s) using the second frequency.

In the present context, a terminal may be any type of communication device, such as a portable device for use in a vehicle, a vessel, a train, an airplane or being handheld, such as a laptop, palmtop, e-book, cell phone, GPS unit or the like. Naturally, the terminal may also be fixed in position in relation to the ground/earth, the transponder(s) or any other suitable coordinate system.

Wireless communication may be performed via any type of wireless regime, such as using electromagnetic radiation, radio waves, light, IR radiation, UV radiation, WiFi networks, or e.g. satellite communication.

In the present context, communication may be one-way or two-way communication, and communication may take place in either direction and in either frequency simultaneously or not.

Any number of transponders may be used, such as 1, 2, 3, 5, 10 or more. In this context, a transponder is any type of circuit, assembly, apparatus or the like which is adapted to perform wireless communication with the terminal. Preferably, the transponder(s) is/are adapted to also communicate with other elements and thus be able to act as a relay station merely relaying information if desired. In this situation, the first and second frequencies are used between the terminal and the transponder/relay station. The same or similar frequencies may be used between the relay station/transponder and the other elements.

In this context, a remote transponder is a transponder not positioned in the neighbourhood of the terminal. Thus, "remote" will mean that the distance is 100 m or more, such as 1 km, 5 km, 10 km or more, such as 100 km, 1000 km or more, such as 10,000 km or more, such as 30,000 km or more.

Naturally, the means for performing wireless communication will be adapted to the wireless regime selected. If optical communication is desired, optical emitters and receivers may be used, whereas, if radio wave communication is desired, radio transmitting/receiving equipment may be used. For some applications, such as long range communication, particular types of antennas may be desired, such as directional antennas. An example is the use of parabolic discs in satellite communication. Directional antennas may be e.g.: parabolic reflector, phased array, patch Array, helix, helical Array, Yagi-Uda array or a horn.

Preferably, the first and second frequencies are so different that the communication at these frequencies has different properties. Usually, such properties are defined at least in part by the frequencies, and it may be desired that the first frequency is below 9 GHz and the second frequency is above 9 GHz, especially if the wireless communication takes place through air/the atmosphere. It is desired that the frequencies are sufficiently different for a difference in properties to exist, whereby it is desired that the second, higher frequency is above 10 GHz. Also, in one embodiment it is desired that the first, lower frequency is below 9 GHz or below 13 GHz.

IEEE has defined Radar-frequency bands (see the Annex), and it is thus preferred that the first frequency is defined in or around the HF, VHF, UHF, L band, S band, C band and X band frequency intervals. Usually, antenna dimensions make the use of frequencies lower than 100 MHz difficult, but this does not render such systems impossible.

Also, it is desired that the second frequency is in or around the X band, Ku band, K band, Ka band, V band, W band or mm band intervals. Usually, the higher the frequency of the carrier, the higher a bandwidth may be transported, but such systems often are more vulnerable to interference etc.

It is noted that the first and/or second frequencies may each be selected within a pre-defined band, which bands then preferably are different. Also, a frequency often is not merely provided as a single frequency but as a frequency selected within an interval of frequencies. Thus, any frequency described hereafter may be a single frequency or a frequency determined or selected within a frequency interval. Preferably, both selected frequencies as well as frequency intervals used simultaneously are non-overlapping.

An advantage of the present invention is that seamless or at least automatic changing over is possible between data transmission on the first and the second frequencies. Thus, if communication is made difficult or impossible on the second frequency, the data may then be routed to and transmitted on the first frequency. Any receiving circuit will be able to determine this and "re-assemble" the data. The operator need not take any action in this regard.

The performing means are adapted to communicate on each of the two frequencies. If possible, the communication on the two frequencies may be performed using the same elements, such as the same antenna, or different elements may be used. In one situation, multiple transceivers are used which are not co-located, whereby multiple antennas may be desired or required.

In the present context, communication at a frequency means communicating using that frequency as a carrier wave for the data communicated. This data may be encoded on the carrier wave in any suitable manner, such as by frequency modulation, phase modulation and/or amplitude modulation or using more elaborate coding schemes, such as:

ASK—Amplitude Shift Keying
PSK—Phase Shift Keying
  8PSK
  16APSK—4 bit Amplitude and Phase Shift Keying
FSK—Frequency Shift Keying
BPSK—Binary Phase Shift Keying
QPSK—Quadrature Phase Shift Keying
OQPSK—Offset Quadrature Phase Shift Keying MSK—Minimum Shift Keying
GMSK—Gaussian minimum-shift keying
_DPSK (Differential Phase Shift Keying)
QAM—Quadrature Amplitude modulation
   16QAM
   32QAM
   64QAM.
or hybrid combinations of the above modulation schemes.

The communication performed comprises a transmission of data from the terminal to the transceiver.

The means for receiving or accessing the data to be transmitted to the transponder(s) may be any type of storage or communication unit. The data may be readily available and need only be retrieved or accessed from e.g. a storage, or the data may be received from e.g. a network receiving data from one or more apparatus, assemblies, networks, PCs, applications or the like. Naturally, as will be described further below, such data may be amended prior to transmission if desired.

Depending on the actual situation, the first part may be any percentage, including 0% and 100%, of the data, as may the second part. Thus, there may not always be a first part or a second part.

In usual applications, the data to be transmitted is not a single file readily available but is streamed data or an amount of data to which more data is added over time. Thus, the first and second parts are not necessarily fixed parts to which data is not added but usually queues to which data is added over time. Then, data to be transmitted may be streamed or be continuously or intermittently provided, whereby, preferably, the receiving/accessing means and the determining means operate to constantly receive/access data or be able to do so, and determine the first and second parts which is/are then streamed to the performing means and communicated. Thus, the first and second parts may be varied in real time, as data is communicated and received/accessed.

The information identifying the second frequency may directly identify the frequency or comprise information rendering the terminal able to determine the frequency, such as an address in a look-up table of the terminal in which different frequencies are identified. Naturally, any other type of information may be used.

In a preferred embodiment, the performing means is adapted to simultaneously, at a first point in time, transmit the first and/or second parts on the first and/or second frequencies, respectively, and receive information identifying one or more third frequencies, the performing means being adapted to, at a second, later point in time, communicate the second part using the third frequency/ies. Preferably, the third frequency/ies is/are different from the first and second frequencies but still of the same "type" as the second frequencies, such as in a higher frequency range. Thus, the higher (second/third) frequency/ies may be controlled via communication on the first frequency. This has an advantage when e.g. the communication on the first frequency is more robust. In one example, communication is not possible at the second frequency, such as due to the wireless communication being prevented due to external factors (weather, sun spots, rain, obstacles), so that the first part of the data comprises all of the data, whereby the communication of the second/third frequency/ies may prepare the communication at these frequencies when the external factors again allow this.

An advantage of this embodiment is that the change from the second to the third frequency may be seamless, i.e. without requiring any intervention from an operator. The data may simply subsequently be transmitted on the third frequency, and a receiving circuit, such as a circuit outputting the information identifying the third frequency/ies or receiving the same information, may be adapted to simply receive the data transmitted on the second and third frequencies and then "re-assemble" these.

In a particular embodiment, the performing means are adapted to communicate with one or more satellites then being the transceiver(s). In this manner, the atmosphere, the weather and the like may interfere with the communication. However, this interference is different for different frequencies, whereby a frequency may be selected at which communication is more robust than at the other frequency, which may have other advantages, such as higher bandwidth.

In this situation, it is preferred that the performing means comprise a single directional antenna adapted to communicate with a plurality of clustered satellites. In this manner, the communication at the different frequencies may be with different satellites while using the same antenna. In this context, clustered satellites preferably are positioned within, seen from the terminal, 5 degrees, such as 3 degrees, preferably 1 degree. In this context, geostationary satellites positioned around 2000 km apart will be within around 3 degrees from each other seen from the ground.

Also or in addition, the antenna(s) may be provided on a single movable/rotatable element in order to render the terminal truly mobile or make it easier to communicate with satellites in non-geostationary orbits. A rotatable element of this type is also called a pedestal or platform.

Alternatively, one antenna is provided on a rotatable/movable element and the other is more fixed but instead has a rotatable boresight, such as is the situation with a phased array antenna. Naturally, the same electronics may be used for determining the desired boresight of the rotatable/movable antenna and that with the rotatable/movable boresight.

In another embodiment, two not co-located satellites, or a satellite and a ground based antenna, for example, may be tracked using two separate antennas.

In one embodiment, the receiving/accessing means is adapted to receive data from a plurality of sources and/or of a plurality of different types, the determining means being adapted to receive/estimate/determine a priority of individual sources/types and perform the determination on the basis of the priority of the data.

Different sources of data providers may be those usually seen over the internet and telephone networks, such as ADSL/ISDN traffic, VoIP, streaming (such as radio/TV), Internet browsing, background printing jobs or file transfer/interchange and text messages. In addition, more specific types of data may be transferred, such as distress voice/messages or data which is very important between vessels/vehicles or airplanes and ground personnel, such as positions, status information, or the like. Some applications may have a reserved bandwidth and others may have bandwidth allocated dynamically.

It is noted that some types of data may not have a high priority in the sense that it is not that important that it is communicated, but still this data may put requirements as to the bandwidth available and to time constraints, such as VoIP.

On the other hand, other data may be of a type which it is very important to have transmitted. This data, however, may not require a large bandwidth or need not absolutely be communicated swiftly, as long as it is certain that it is communicated within a reasonable time. Data of this type may be distress calls and the like.

Thus, the determination of the first and second parts may take the above into account, so that the most important/vital data can be introduced into the first part and more bandwidth requiring but less vital data in the second part, for example.

In one embodiment, the determining means is adapted to reduce an amount of data in the first part before transmission. This may be so as to ensure that all data is transmitted within a desired time. The reduction may be a filtering or prioritization of the data or may be an omission of data. The filtering/prioritizing/compression may be performed to obtain a preferred/predetermined size of the first part or may be the filtering/omission of predetermined types of data and/or data from predetermined data sources or applications, for example.

In one embodiment, the performing means comprises:
means for directing a beam of electromagnetic radiation having the second frequency in a predetermined direction and
means for receiving, from the transponder(s) and on the first of the frequencies, information identifying a position or direction and for operating the directing means to direct the beam along the direction or toward the position.

In this situation, the directing of the beam may be the directing (rotation or movement) of an antenna, such as the parabola of a parabolic antenna, or the adaptation of the phase of phased array antennas, for example. A combination may also be used.

Thus, in situations where the position of the transponder(s) or the direction thereto is not known, which may be when the trajectory or position is not known, this direction or position may be communicated to the terminal in order for it to be able to communicate with the transponder(s). Usually, this will be for non-geostationary satellites, so that the direction or position information is real time information or information useful only for a predetermined period of time, such as a few minutes, whereby a period of time from receipt of the information identifying the angle/position to directing the beam along the direction or to the position may be only a few minutes or even a few seconds, such as less than 2 minutes, preferably less than 30 seconds, such as less than 10 seconds.

This embodiment may be altered so that the terminal, from several positions/directions and a time difference between the receipt of information identifying such positions/directions is able to derive tracking or trajectory data and derive future positions or directions from this data.

A second aspect relates to a system comprising one or more satellites and one or more ground based stations adapted to communicate with the satellite(s) and a terminal according to the first aspect of the invention adapted to communicate with the satellite(s), one or more of the ground based stations being adapted to transmit, to the terminal and in the first frequency, the information identifying the second frequency.

In this respect, a ground based station usually is a structure fixed in relation to the ground and adapted to communicate with one or more satellites. Such structures may also be called SAS—Satellite Access Station, RAN—Radio Access Node, Earth Station, Ground Station, satellite gateway or LES—Land Earth Station.

In one situation, the performing means is adapted to receive frequency information from a ground station via the satellite(s), and wherein the determining means is adapted to perform the determination on the basis of the frequency information.

This frequency information may be provided by another element which defines one or both of the first and second frequencies. This determination may be made in a number of manners, such as on the basis of a position of the terminal and knowledge of which frequencies are available at that position.

On the basis of the frequency information, the determination may be made, such as on the basis of knowledge of a bandwidth available at the frequency.

In that or another situation, the system may further comprise means for determining or estimating a link quality between the ground based station(s) and the terminal and outputting corresponding information, the determining means being adapted to perform the determination on the basis of information relating to the corresponding information.

Naturally, the "link quality" may be determined in any desired manner and may be quantified as desired, such as on the basis of:

SNR—Signal to noise ratio >SNR(dB)=10*log 10(P_signal/P_noise)<.

BER—Bit Error Rate is the number of received binary bits that have been altered due to noise and interference, divided by the total number of transferred bits during a studied time interval.

C/No—Carrier to Noise ratio.

Eb/No—Energy per bit relative to noise power spectral density.

PER—Packet Error Rate.

or other means of determining the data throughput rate and/or QoS of the link.

It is noted that the link quality may very well differ for the different frequencies, and this determination may be made for each frequency, or the result at one frequency may be used for estimating the link quality of another frequency.

Usually, the communication between the ground based station and the terminal will be based on the overall link quality, even though this link quality is a sum of the quality of the "leg" between the ground based station and the satellite or the "leg" between the satellite and the terminal.

It is noted that a number of data transmission protocols are adapted to evaluate a bandwidth possible at the frequency in question, and from this, the link quality may be determined.

When the link quality has been determined or estimated, the ground based station or the terminal, whichever has the determining/estimating means, may output this to the other of the terminal/ground based station, and the determining means is adapted to perform the determination on the basis thereof. Thus, the sizes of the first and second parts, any filtering/prioritization/omission or the like, etc. may be controlled by this information.

In another situation, the terminal comprises means for determining or estimating a link quality between the satellite(s) and the terminal and outputting corresponding information, the performing means being adapted to transmit the corresponding information to one or more ground stations, the one or more ground stations being adapted to derive the information identifying the second frequency on the basis of the corresponding information.

Thus, depending on the link quality at the terminal, the ground stations may determine or define the second frequency, such as to have optimal link quality at the second frequency between the satellite and the terminal.

A third aspect of the invention relates to a method of communicating with one or more remote transponders, the method comprising:
performing wireless communication with the transponder(s) on each of two different frequencies,
receiving or accessing data to be transmitted to the transponder(s), determining any first part of the data for transmission on a first of the two frequencies and any remaining, second part of the data for communication on a second of the frequencies, the performing step comprising:

receiving, from the transponder(s) and on the first of the frequencies, information identifying the second frequency, communicating the first part, if any, to the transponder(s) using the first frequency, communicating the second part, if any, to the transponder(s) using the second frequency.

As mentioned, the first and second parts may take up from and including 0% to and including 100% of the data. Data normally is more or less constantly received, and the data received is divided into the first and second parts which may be stored with, transmitted with and/or enqueued with other first and second parts.

Thus, seamless or automatic operation may be obtained where data may be transmitted on the first and second frequencies, and the determining means may in real time and depending on e.g. external factors, determine on which of the frequencies data is transmitted. Any receiving circuit may receive the data on either frequency. No intervention from an operator is required. It may not, however, be avoidable that a decrease in bandwidth is the result of this change.

In one situation, the performing step comprises simultaneously, at a first point in time, transmitting the first and/or second parts on the first and/or second frequencies, respectively, and receiving information identifying one or more third frequencies, the performing means being adapted to, at a second, later point in time, communicate the second part using the third frequency/ies. Thus, a change over may be performed ordered or instructed via the first frequency.

Also in this regard, the operation is seamless in that the change over from the second to the third frequencies require no intervention from an operator. For example, a spot change over in satellite communication may be handled without the operator needing to know.

Different satellites usually have different coverage areas or spots on the ground, whereby movement over the ground/sea will bring the performing means out of the spot of one satellite and into that of another. In this situation, communication with the first satellite on the second frequency will deteriorate, whereby shifting to the third frequency for communication with the second satellite may be performed. This operation may be called "spot change over".

In one embodiment, the performing step comprises communicating with, as the transponder(s), one or more satellites. Then, the performing step could comprise communicating with a plurality of clustered satellites via a single directional antenna.

In that or another embodiment, the antenna(s) is/are provided on a single movable/rotatable element, the performing step comprising moving/rotating the element to maintain a direction of the antenna(s) toward the satellite(s). This moving/rotating may be a known pointing or tracking of the satellite(s).

The receiving/accessing step preferably comprises receiving data from a plurality of sources and/or of a plurality of different types, the determining step comprising receiving/ estimate/determining a priority of individual sources/types and performing the determination on the basis of the priority of the data. As mentioned above, a number of situations and data types exist, and the determining step may act to ensure that the most vital information is transmitted at the first frequency.

In one situation, the determining step comprises reducing an amount of data in the first part before transmission.

In one embodiment, the performing step comprises communicating with one or more satellites and one or more ground based stations communicating with the satellite(s), wherein the receiving step comprises one or more of the ground based stations transmitting, to the terminal and in the first frequency, the information identifying the second frequency.

In this situation, the performing step could comprise receiving frequency information from a ground station via the satellite(s), and wherein the determining step comprises performing the determination on the basis of the frequency information. Thus, the ground station could be controlling the frequency allocation to the terminal.

Also or alternatively, the method could further comprise the step of determining or estimating a link quality of the communication to and/or from the ground based station(s) and outputting corresponding information, the determining step comprises performing the determination on the basis of information relating to the corresponding information.

In addition or alternatively, the method could comprise the step of determining or estimating a link quality in the communication to and/or from the satellite(s) and outputting corresponding information, the performing step comprising transmitting the corresponding information to one or more ground stations, the one or more ground stations deriving the information identifying the one or more frequencies on the basis of the corresponding information.

Finally, the performing step could furthermore comprise receiving, from the transponder(s) and on the first of the frequencies, information identifying a position or direction, and wherein the step of communicating the second part comprises directing a beam of radiation representing the second part along the direction or toward the position.

This may be relevant in e.g. satellite communication even when the communication on the first and second frequencies are with the same satellite/transponder, in that the satellite may output and receive information on one frequency even when the terminal antenna is not directed toward the satellite, but communicating via the second frequency may require a more precise direction of the antenna or beam toward the satellite. Satellites may have wider and more narrow spots inside which communication may take place.

In the following, preferred embodiments are described with reference to the drawing, wherein.

Figure 1:
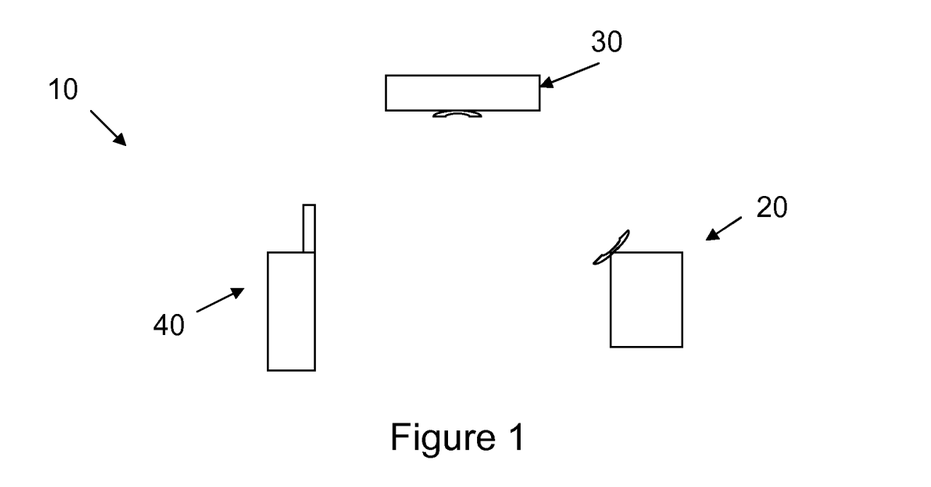
FIG. 1 illustrates the overall elements of a system according to a first embodiment.

In FIG. 1, the most important elements of a system 10 according to the invention are illustrated. These elements are an earth based station 20 communicating with a mobile terminal 40 via a satellite 30.

Usually, the station 20 and the satellite 30 communicate with each other using parabolic antennas, and the terminal 40 may also have a parabolic antenna or any other type of antenna.

Normally, the station 20 is fixed, and the satellite 30 preferably is in a geostationary orbit, whereby the pointing of the discs of the station 20 and the satellite 30 toward each other is made easy.

Even though the terminal may have any type of antenna, a mobile terminal 40 preferably has a stabilized platform, as is known in the art, for maintaining the direction of a direction sensitive antenna, such as a parabolic antenna, toward the satellite 30 at all times or as often as possible. The pointing or controlling of the stabilized platform may be based on a determined direction toward the satellite (such as determined from a signal strength received from the satellite and a variation of the pointing direction of the antenna) and/or from kinetic sensors provided on or at the terminal 40 and/or stabilized platform.

The mobile terminal 40 may be provided on a vehicle or vessel, such as a ship, an airplane, a space craft, a ground-based vehicle, such as a train, a truck, a bus, a car, or may simply be hand-held, such as part of a portable computer, a mobile telephone or the like.

Naturally, the terminal 40 may communicate with any number of satellites 30, geostationary or not.

The communication between satellite 30 and the terminal 40 station 20 takes place using one or more carrier frequencies, usually within predetermined frequency bands.

Usually, the signals output from the satellite 30 are defined to be spots or areas on the ground. Multiple such spots may be provided with different frequencies, sizes, positions and data transfer capabilities.

In some situations, one or more larger spots may be provided via which the satellite 30 and terminal 40 may communicate and exchange small amounts of data, such as text messages, positions and the like. If larger amounts of data are to be transferred, a more narrow spot is used, where the station 20 instructs the satellite 30 to operate another more focussed antenna covering the area in which the terminal 40 is present. This type of communication, however, is more expensive and thus only used when necessary. Naturally, the terminal 40 may move during communication, and when approaching an edge of a spot or a border between two spots, spot hand-over may take place controlled by the station 20. This handing over usually comprises the instruction of the terminal 40 to communicate with the satellite 30 on a new frequency of a spot into which the terminal 40 moves.

Some satellites 30 may be adapted to communicate with the station 20 and/or terminals 40 on multiple frequencies and/or within multiple bands. Alternatively, the terminal 40 may communicate with one satellite 30 on one frequency/in one band and with another on/in another frequency/band, and the satellites 30 may each communicate with a separate station 30, where the stations 20 then communicate with a common communication unit (not illustrated) which is able to perform the below determination and feed the data/information to be transmitted to the relevant station 20.

Different frequencies/bands have different advantages. Usually, lower frequency bands, such as the L-band having a frequency of 1-2 GHz has the advantages of being stable even during bad weather, such as during rain. In addition, L-band communication may take place even if a directional antenna, such as a parabolic antenna, is directed several degrees off the direction toward the satellite. Also, L-band or lower frequency communication may take place even if an obstacle, such as a mast or electrical pole, is positioned directly between the terminal 40 and the satellite 30. On the other hand, L-band communication is not able to carry a high bandwidth.

Many standards define not only a wavelength/frequency but also different data rates or coding rates within a frequency, if the signal-to-noise-ratio varies. Thus, a coding/data rate may be reduced, if the SNR decreases in order to maintain communication with a sufficient Bit Error Rate.

Opposed to the L-band or lower frequency communication, higher frequency communication, such as frequencies of 12-40 GHz and/or such as using the Ka, K or Ku bands, is able to carry a higher bandwidth. However, such bandwidths are more sensitive to e.g. rain and obstacles obstructing the direct line of sight between the terminal 40 and the satellite 30.

The present terminal 40 and station 20 are both adapted to transmit and receive data to each other via the satellite(s) 30 using both of the wavelengths/bands. Thus, the terminal 40 and the station 20, having determined/received/derived the data to transmit, will be able to determine which frequency/band to use for the transmission of the data. Naturally, the data may be split and transmitted in part over one of the frequencies/bands and part over the other, but normally, all data to be transmitted will be transmitted over the higher frequency/frequency band, if this is operable. If this higher frequency is not available, the data is transmitted via the lower frequency/band.

The communication with the satellite 30, station 20 or via such elements to the internet or another source/destination may relate to any type of communication, such as the determination of a position of the terminal 40 or the transmission from the terminal 40 of information relating to one or more conditions at the terminal, such as position, direction, or the like. Also, other types of communication, such as mails, messages, Internet browsing, speech, file interchange or the like may take place. When the terminal 40, or its user, is out of reach of "usual" internet or telephone connections, such information may be transmitted via the satellite 30 and station 20.

Naturally, different types of data may be more or less important and have different requirements as to the transmission. VoIP data, for example, may not be the most vital data to transmit, but if transmitted, this data sets bandwidth timing restraints to the communication so that long interruptions are avoided. Other data, such as position data, text messages or the like, may have much lower requirements as to timing, but it may be extremely important to ensure that some of this data, such as position data, is actually transmitted.

A particularly interesting manner of dividing data is as to the importance thereof in transmission and thus receipt of the station 20. Very important data may be distress/urgency voice/data or the like. Such data/voice may relate to a vessel/vehicle/airplane in distress and/or relate to voice data, messaging, alerts, vessel safety, identification, weather information, tracking, monitoring or the like. High priority voice or messages may be routed both to and from the shore/ground station(s) to e.g. a ship/vehicle/airplane.

The amount of the data to be transmitted via the lower and higher frequencies/bands may be determined in a number of manners, such as on the basis of a link quality or possible data rate/bandwidth over the pertaining frequency/band.

The link quality may depend on a number of factors, such as the weather or obstacles positioned between the communicating elements. In the present embodiment, the link quality is the overall quality of the link from the station 20 to the terminal via the satellite 30. Usually, if the communication between a station 20 to a satellite is deteriorated due to bad weather, this station 20 may acknowledge this and instruct e.g., another station 20 positioned at another physical location to communicate with the satellite 30. However, if the weather at the terminal 40 is bad, change over to another satellite 30 may not be possible, thus, the possibility to retreat to the lower frequency. In general, the terminal 40 may be adapted to estimate the quality of the link between the satellite 30 and the terminal 40 and forward this information, such as part of the data to be transmitted, to the station 20, to aid the terminal 20 in determining whether to change to the lower frequency band or to another station 20.

In general, the terminal 40/station 20 may, when using the lower frequency/band with its lower bandwidth, reduce the amount of data to transmit to have the data transmitted sufficiently fast. This reduction may be a compression or the omission of some of the data.

However, as will be described in further detail below, it is required that some controlling information is always transmitted on the lower frequency/frequency band in order to ensure that this information is exchanged irrespectively of whether the higher frequency/frequency band is available or not.

Figure 2:
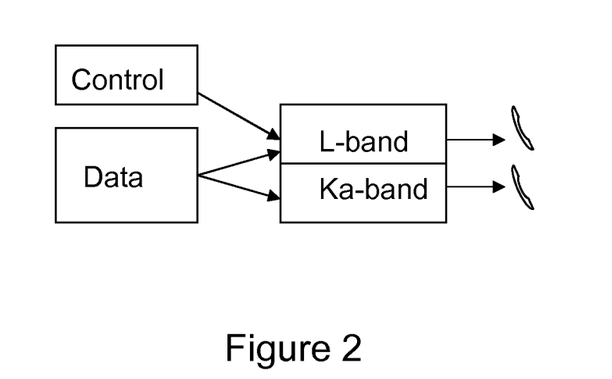
FIG. 2, illustrates the division of data to two different frequencies/bands.

This is illustrated in FIG. 2 in which the collected information to be transmitted is the controlling information and the data. It is seen that the controlling information is always routed to the lower frequency/frequency band, here exemplified by the L-band, whereas it is selectable whether the data, or which part thereof, is transmitted via the lower frequency/frequency band or the higher frequency/frequency band, here exemplified by the Ka-band.

Other data which may be transmitted on the lower frequency band even though the higher frequency band is or seems to be operable is the above high priority or distress data/voice or the like.

Figure 3:
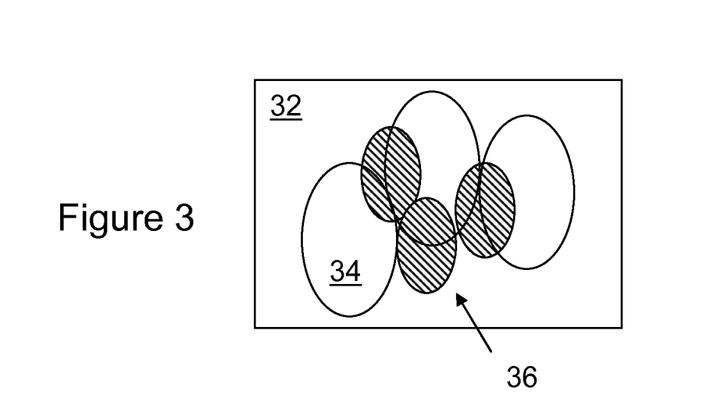
FIG. 3 illustrates examples of spot positions.

In FIG. 3, the above situation is illustrated. A part of the larger spot for the low-bandwidth communication is illustrated by a square 32 inside which are illustrated different, possible spots 34 at one transmission wavelength/communication band, and other possible spots 36 at another transmission wavelength/communication band. It is seen that the spots of the two different frequencies/bands need not overlap, whereby spot hand-over may take place at different points in time and at different positions for the two wavelengths/bands.

The information transmitted within the spots usually will have different frequencies, whereby the terminal 40 is to alter its communication frequency, which may be within the same overall band, when performing a spot change-over. This frequency and the time of performing this handing over is normally controlled by the station 20, and the information required by the terminal 40 for performing this is forwarded from the station 20 to the terminal 40 via the lower frequency/frequency band.

The reason for this is that this hand-over information will reach the terminal 40 even when the higher frequency band is unavailable. Thus, when moving from one spot to the other, the terminal 40 may still be attempting to communicate over the high frequency band, but now with the new, correct frequency, which would not be possible, if this new frequency was not communicated to the terminal 40.

It is noted that the above embodiment is not limited to the situation where the higher and lower frequency communication takes place using the same satellite 30 and the same station 20 or even the same antenna on the terminal 40. Multiple satellites 30 may be used, and these may be geostationary or not. Communicating with one or more non-geostationary satellites requires tracking equipment which, however, is known in the art.

In a particularly interesting embodiment, a single satellite 30 is used, or multiple satellites 30 are used which are positioned close to each other so that a single antenna, such as a parabolic antenna, may be used by the terminal 40. In this situation, the distance between the satellites 30 preferably is so low that they, seen from the terminal 40, are positioned within a few degrees, such as 2 degrees or even 1 degree. Preferably, the distance between the satellites is so low that they, seen from the terminal 40, are positioned such that both satellites can be covered by the antenna beamwidth and such that communication to both satellites is supported simultaneously.

Then, the robustness and relative angular insensitivity of the lower frequency communication compared to the higher frequency communication may be used in the following manner.

Figure 4:
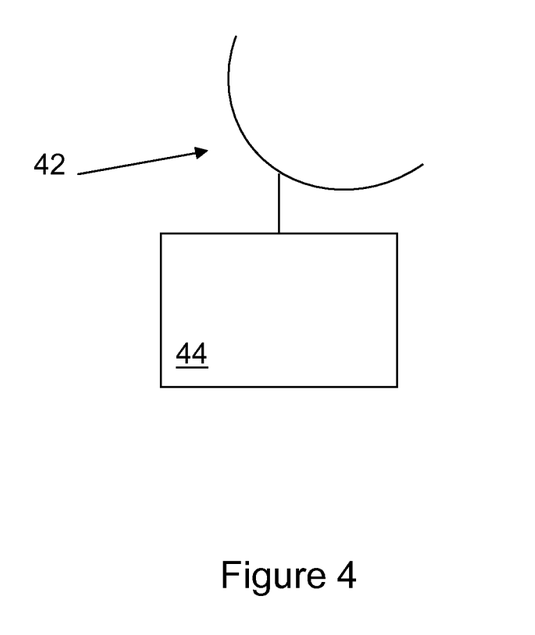
FIG. 4 illustrates a parabolic antenna of a transducer, the antenna being held and rotated by a so-called stabilized platform.

FIG. 4 illustrates a parabolic antenna 42 of the transducer 40, the antenna is held and rotated by a so-called stabilized platform 44 which ensures that the antenna 42 is always directed toward the satellite(s) 30. This direction may be determined from a strength of a signal received from the satellite(s) 30, such as when slightly rotating the antenna 42 to determine a direction of highest signal strength. Alternatively or additionally, the platform 44 may comprise kinetic sensors for determining any rotation of the platform 44, such as due to movement of a vehicle or the like having the transducer 40.

Thus, in spite of any movement of the transducer 40 or the satellite(s) 30, the platform will act to ensure that the antenna 42 is directed toward the satellite(s) 30.

It is clear that if the antenna 42 was to track solely on the higher frequency signal, a deviation in boresight of the antenna 42 of only a few degrees would reduce the received signal to zero, whereby the communication is broken off. The lower frequency communication may be maintained with a higher angular deviation, so that the pointing system is more robust, if the pointing is controlled by the lower frequency signal which will bring the antenna at least close to the correct direction, so that the higher frequency communication may be resumed.

Thus, the direction toward the satellite 30 may actually be forwarded to the transducer 40 which may then direct the antenna 42 in that direction in order to communicate with the satellite 30 on the second frequency. Alternatively, a position of the satellite 30 may be communicated and used for the directioning of the antenna 42. This is in particular relevant for non-geostationary satellites or new satellites 30 the position or trajectory of which are not known to the transducer 40 which therefore requires the position/direction information.

Annex:

The individual frequencies or frequency intervals with which communication takes place with satellites usually are divided into bands. The IEEE Standard Radar Band Nomenclature is:

(*IEEE Std. 521-2002, IEEE Standard Letter Designations for Radar-Frequency Bands)

| Designation | Frequency |
| --- | --- |
| HF | 3-30 MHz |
| VHF | 30-300 MHz |
| UHF | 300-1000 MHz |
| L Band | 1-2 GHz |
| S Band | 2-4 GHz |
| C Band | 4-8 GHz |
| X Band | 8-12 GHz |
| Ku Band | 12-18 GHz |
| K Band | 18-27 GHz |
| Ka Band | 27-40 GHz |
| V Band | 40-75 GHz |
| W Band | 75-110 GHz |
| mm Band | 110-300 GHz |

A FCC Frequency Allocation Table for Mobile-Satellite and Fixed-Satellite under 100 GHz has a number of frequencies/intervals which may be divided into the above bands, where the lowest frequency in the interval is used for allocating the frequency interval to an IEEE band:

| IEEE Radar band | Min (MHz) | Max (MHz) |
|---|---|---|
| UHF | 312 | 315 |
| UHF | 387 | 390 |
| UHF | 399.9 | 400.05 |
| UHF | 400.15 | 401 |
| UHF | 406 | 406.1 |
| UHF | 455 | 456 |
| UHF | 459 | 460 |
| UHF | 608 | 614 |
| L-Band | 1390 | 1392 |
| L-Band | 1430 | 1432 |
| L-Band | 1518 | 1559 |
| L-Band | 1610 | 1660.5 |
| L-Band | 1668 | 1675 |
| L-Band | 1930 | 1970 |
| L-Band | 1980 | 2025 |
| S-Band | 2120 | 2200 |
| S-Band | 2483.5 | 2535 |
| S-Band | 2670 | 2690 |
| S-Band | 3400 | 4200 |
| C-Band | 4500 | 4800 |
| C-Band | 5150 | 5250 |
| C-Band | 5725 | 7075 |
| C-Band | 7250 | 7750 |
| C-Band | 7900 | 8400 |
| X-Band* | 10700 | 13250 |
| Ku-Band | 14000 | 14800 |
| K-Band | 19700 | 21200 |
| K-Band | 24750 | 25250 |
| Ka-Band | 29500 | 31000 |
| Ka-Band | 39500 | 47000 |
| V-Band | 47200 | 50200 |
| V-Band | 50400 | 51400 |
| V-Band | 66000 | 76000 |
| W-Band | 81000 | 86000 |

*Satcom at 10.7-12.75 GHz is often referred to as Ku-band.

The invention claimed is:

1. A terminal for communicating with one or more remote transponders, the terminal comprising:
   one or more antennas configured to perform wireless communication with the transponder(s) on each of two different frequencies,
   a storage or communication unit configured to receive or access data to be transmitted to the transponder(s),
   means for determining any first part of the data for transmission on a first of the two frequencies and any remaining, second part of the data for communication on a second of the frequencies, the first frequency being below 9 GHz and being selected within a first frequency interval, the second frequency being above 10 GHz and being selected within a second frequency interval, the first and second frequency intervals being non-overlapping,
   the antenna(s) being configured to:
   receive, from the transponder(s) and on the first frequency, information identifying the second frequency,
   communicate the first part, if any, to the transponder(s) using a frequency within the first frequency interval, and
   communicate the second part, if any, to the transponder(s) using the second frequency.

2. The terminal according to claim 1, wherein the antenna(s) is/are configured to simultaneously, at a first point in time, transmit the first and/or second parts on the frequency within the first frequency interval and/or the second frequency, respectively, and receive information identifying one or more third frequencies, the third frequency/ies being above 10 GHz, the performing means being adapted to, at a second, later point in time, communicate the second part using the third frequency/ies.

3. The terminal according to claim 1, wherein the antenna(s) is/are configured to communicate with one or more satellites.

4. The terminal according to claim 3, wherein the antenna(s) comprise(s) a single directional antenna configured to communicate with a plurality of clustered satellites.

5. The terminal according to claim 2, wherein the antenna(s) is/are provided on a single movable/rotatable element.

6. The terminal according to claim 1, wherein the antenna(s) comprise(s):
   means for directing a beam of electromagnetic radiation having the second frequency in a predetermined direction and
   means for receiving, from the transponder(s) and on the first frequency, information identifying a position or direction and for operating the directing means to direct the beam along the direction or toward the position.

7. A system comprising one or more satellites and one or more ground based stations configured to communicate with the satellite(s) and a terminal according to claim 1 configured to communicate with the satellite(s), one or more of the ground based stations being configured to transmit, to the terminal and in the first frequency, the information identifying the second frequency.

8. The system according to claim 7, wherein the antenna(s) is/are configured to receive frequency information from a ground station via the satellite(s), and wherein the determining means is configured to perform the determination on the basis of the frequency information.

9. A method of communicating with one or more remote transponders, the method comprising:
   performing wireless communication with the transponder(s) on each of two different frequencies,
   receiving or accessing data to be transmitted to the transponder(s),
   determining any first part of the data for transmission on a first of the two frequencies and any remaining, second part of the data for communication on a second of the frequencies, the first frequency being below 9 GHz and being selected within a first frequency interval, the second frequency being above 10 GHz and being selected within a second frequency interval, the first and second frequency intervals being non-overlapping,
   the performing step comprising:
   receiving, from the transponder(s) and on the first frequency, information identifying the second frequency,
   communicating the first part, if any, to the transponder(s) using a frequency within the first frequency interval,
   communicating the second part, if any, to the transponder(s) using a frequency within the second frequency interval.

10. The method according to claim 9, wherein the performing step comprises simultaneously, at a first point in time, transmitting the first and/or second parts on the frequency within the first frequency interval and/or the second frequency, respectively, and receiving information identifying one or more third frequencies, the third frequency being above 10 GHz, the performing means being adapted to, at a second, later point in time, communicate the second part using the third frequency/ies.

11. The method according to claim 9, wherein the performing step comprises communicating with, as the transponder(s), one or more satellites.

12. The method according to claim 11, wherein the performing step comprises communicating with a plurality of clustered satellites via a single directional antenna.

13. The method according to claim 12, wherein the antenna(s) is/are provided on a single movable/rotatable element, the performing step comprising moving/rotating the element to maintain a direction of the antenna(s) toward the satellite(s).

14. The method according to claim 9, wherein the performing step comprises communicating with one or more satellites and one or more ground based stations communicating with the satellite(s), wherein the receiving step comprises one or more of the ground based stations transmitting, to the terminal and in the first frequency, the information identifying the second frequency.

15. The method according to claim 14, wherein the performing step comprises receiving frequency information from a ground station via the satellite(s), and wherein the determining step comprises performing the determination on the basis of the frequency information.

16. The method according to claim 9, wherein the performing step furthermore comprises receiving, from the transponder(s) and on the first of the frequencies, information identifying a position or direction, and wherein the step of communicating the second part comprises directing a beam of radiation representing the second part along the direction or toward the position.

17. The terminal according to claim 1, wherein:
the first frequency interval comprises one of the group consisting of: a HF band, a VHF band, a UHF band, a L band, a S band, and a C band and wherein
the second frequency interval comprises one of the group consisting of a Ku band, a K band, a Ka band, a V band, a W band, and a mm band.

18. The method according to claim 7, wherein:
the first frequency interval comprises one of the group consisting of: a HF band, a VHF band, a UHF band, a L band, a S band, and a C band and wherein the second frequency interval comprises one of the group consisting of a Ku band, a K band, a Ka band, a V band, a W band, and a mm band.

19. The terminal according to claim 1, wherein the storage or communication unit is configured to receive data from a plurality of sources and/or of a plurality of different types, the determining means being adapted to receive/estimate/determine a priority of individual sources/types and perform the determination on the basis of the priority of the data.

20. The method according to claim 7, wherein the receiving/accessing step comprises receiving data from a plurality of sources and/or of a plurality of different types, the determining step comprising receiving/estimate/determining a priority of individual sources/types and performing the determination on the basis of the priority of the data.

* * * * *